March 18, 1941.   C. L. LAWRANCE   2,235,486
CONNECTING ROD STRUCTURE FOR ENGINES
Filed May 18, 1938   3 Sheets-Sheet 2
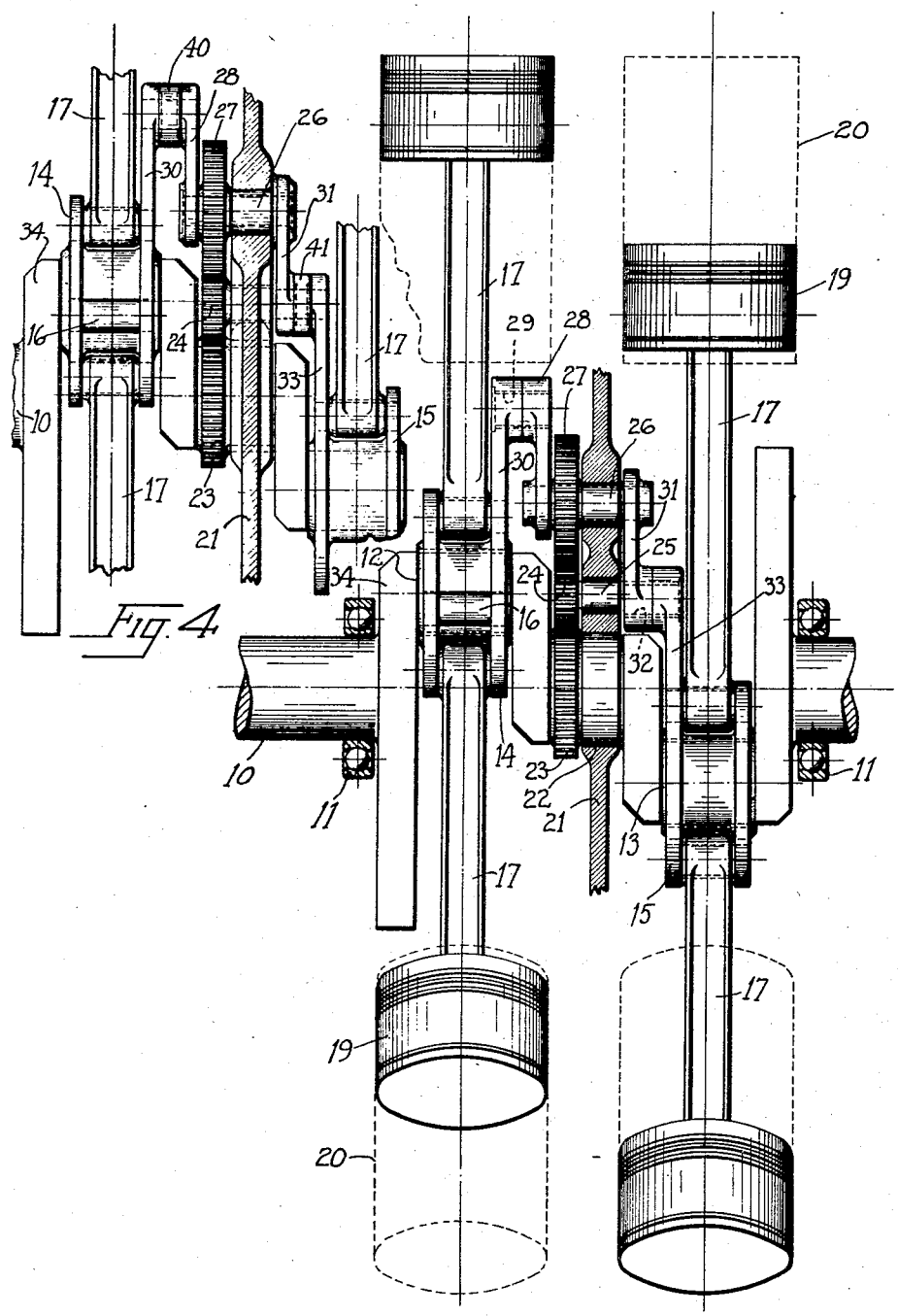
INVENTOR
Charles Lanier Lawrance
BY
ATTORNEY Patented Mar. 18, 1941

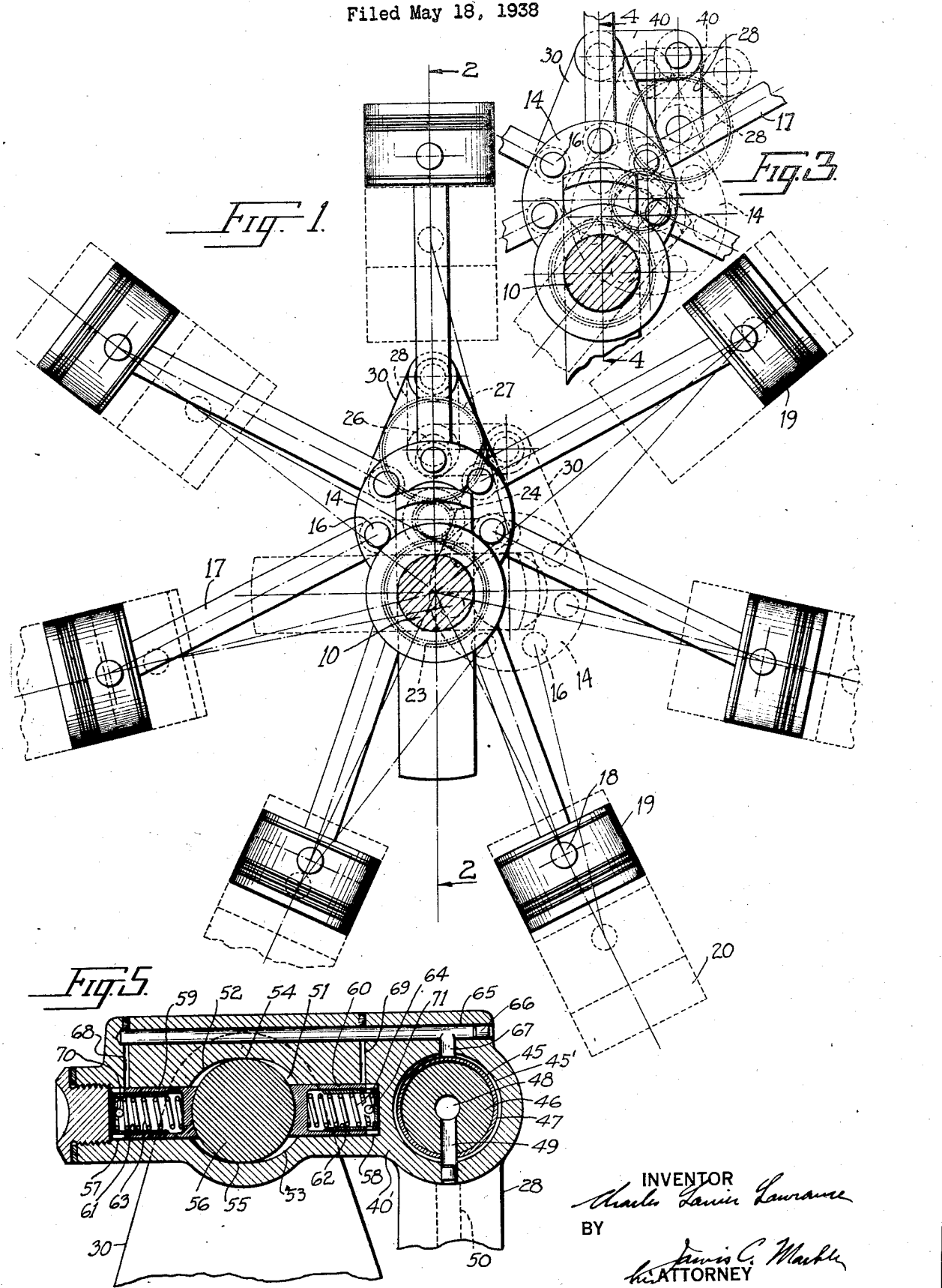

2,235,486

UNITED STATES PATENT OFFICE 2,235,486

CONNECTING ROD STRUCTURE FOR ENGINES

Charles Lanier Lawrance, New York, N. Y., assignor to Lawrance Engineering and Research Corporation, Linden, N. J., a corporation of Delaware Application May 18, 1938, Serial No. 208,559

21 Claims. (Cl. 74—580)

The present invention relates to radial engines and has particular reference to means providing a driving connection between the connecting rods and crankshaft thereof. More specifically, the invention relates to means of the above character in which the relation between each connecting rod of any one bank of cylinders and the crank pin is the same as for all other connecting rods of the same bank whereby the character of the reciprocatory motion transmitted to the several pistons of the bank is identical.

The general object of the invention is to improve upon the prior forms of construction for this general type of apparatus and inter alia to provide cushioning means for absorbing shocks transmitted to the mechanism from the pistons.

The manner in which the above general object and other and more detailed objects of the invention are attained, together with the advantages to be derived from its use, will best be understood from a consideration of the ensuing portion of this specification, taken in conjunction with the accompanying drawings illustrative of different embodiments of apparatus for carrying the invention into effect.

In the drawings:

Fig. 1 is a more or less diagrammatic end view of one embodiment of my invention, only a single bank of cylinders being shown;

Fig. 2 is a cross-sectional view taken on the line 2—2 of Fig. 1, but showing two banks of cylinders;

Fig. 3 is a more or less diagrammatic view of another embodiment of my invention;

Fig. 4 is a cross-sectional view taken on the line 4—4 of Fig. 3;

Fig. 5 is a cross-sectional view of a cushioning device which may be employed in the embodiment illustrated in Figs. 3 and 4;

Figures 6, 7:
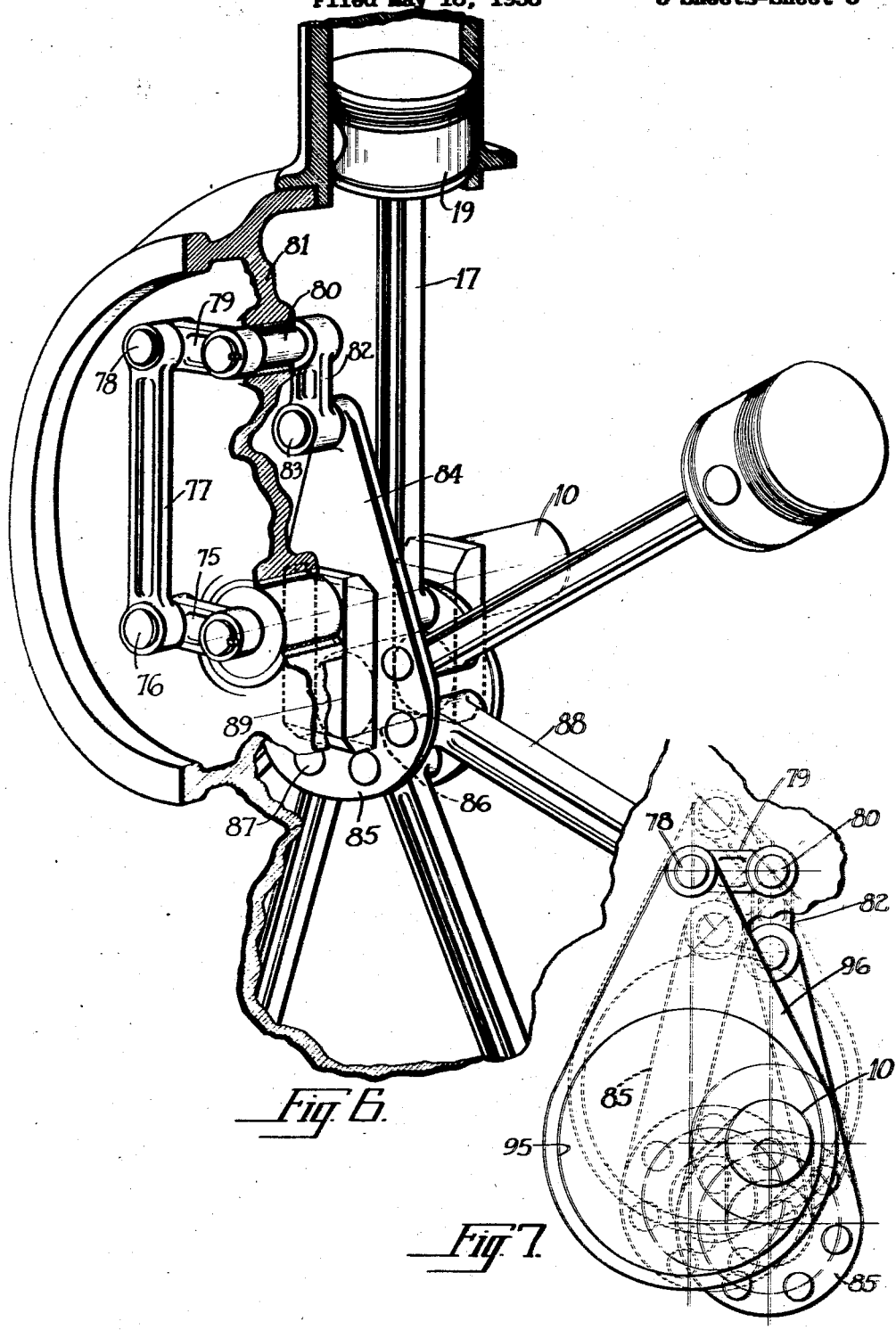
Fig. 6 is a perspective view of a third embodiment of my invention.
Fig. 7 is a more or less diagrammatic end view of a modification of the device shown in Fig. 6.

Referring more particularly to Fig. 1 and 2, reference character 10 designates the crank shaft of a radial internal combustion engine. The crank shaft is mounted for rotation in the main bearings 11. As shown in the figures, the motor includes two banks of seven cylinders each, (for the sake of simplicity, only one bank is shown in Fig. 1) and the crankshaft is provided with two crank pins 12 and 13 disposed at 180°. Rotatably mounted on the crank pins are spool members 14 and 15, respectively. Each spool member is provided with seven connecting rod bearings 16 equidistantly spaced peripherally and all disposed the same distance from the center of rotation of the spool member. On each bearing 16 there is mounted a connecting rod 17. The connecting rods are pivotally secured by means of wrist pins 18 to pistons 19 arranged for reciprocal movement within the radially arranged cylinders, shown in dotted lines and designated by reference character 20.

A fixed wall or diaphragm 21, secured to or forming part of the crank case of the motor, extends inwardly to the crankshaft between the crank pins 12 and 13. The wall 21 may provide a main bearing 22 for the crankshaft. Rigidly secured to the crankshaft is a gear 23 which meshes with an idler gear 24 rotatably mounted on a stud 25 carried by the wall 21. Rotatably mounted in the wall 21 is a shaft 26 to which is fixed a gear 27. Gear 27 is of the same diameter as gear 23 and meshes with idler gear 24. Fixed to the shaft 26 on one side of wall 21 is a crank arm 28 which is pivotally secured by means of a pin 29 to an arm 30 secured to or integral with spool 14 and extending radially beyond the connecting rod bearings 16. The distance from the center of shaft 26 to the center of pin 29 is the same as the throw of the crankshaft. Fixed to the end of shaft 26 on the other side of wall 21 is a crank arm 31 which is pivotally connected by means of a pin 32 to an arm 33 fixed to or integral with spool 15. The length of arm 31 from the center of shaft 26 to the center of pin 32 is likewise eqal to the throw of the crankshaft.

The above described device operates as follows:

Due to the fact that gears 23 and 27 are of the same diameter and are geared through the idler gear 24, these two gears will rotate in the same direction and at the same speed. Consequently, upon rotation of crankshaft 10, the crank arms 28 and 31, connected to shaft 26, will rotate in the same direction and at the same speed as the crankshaft and will at all times remain parallel to the webs 34 which carry the crank pins 12 and 13. Therefore, the spools 14 and 15 will move in circular orbits with the crank pins but each spool at any instant is parallel to the position which it occupies at any other instant. The spools may therefore be said to move parallel to themselves.

In Fig. 1 the parts are shown in one position in solid lines and in another position, corresponding to a 90° rotation of the crankshaft, in dotted lines and it will be apparent that the spool 14 in the position shown in full lines is parallel to the position shown in dotted lines. Inasmuch as all of the connecting rod bearings 16 are disposed at an equal distance from the crank pins, all of the pistons 19 will be given identical reciprocating movements within their respective cylinders.

In the embodiment illustrated in Figs. 3 and 4, corresponding parts are given the same reference characters as those employed in Figs. 1 and 2. This embodiment differs from that previously described in that a link 40 is interposed between the ends of arms 28 and 30 and a similar link 41 is interposed between the ends of arms 31 and 33. The links 40 and 41 are pivotally connected to the respective arms with which they are associated.

In operation, the shaft 26 is caused to rotate in the same direction and at the same speed as the crankshaft, as explained in conection with Figs. 1 and 2. Consequently, the arms 28 and 31 are at all times parallel to the webs 34 of the crankshaft and through the links 40 and 41 cause the spools 14 and 15 to move parallel to themselves. In Fig. 3 the parts are shown in solid lines for one position and in dotted lines for a position corresponding to a rotation of the crankshaft through 45° and it will be noted that spool 14 in one position is parallel to itself in the other position. The provision of links 40 and 41 permits the different parts of the mechanism, such for instance as the arms 28 and 30, to expand different amounts without subjecting the connected parts to stress as a result of such unequal expansion.

In Fig. 5 there is illustrated a link 40' which embodies a cushioning device and which link may be substituted for the link 40 shown in Figs. 3 and 4. The link 40' is provided with a cylindrical bearing 45 within which is journaled the pin 46 which is rigidly secured to the end of arm 28. Pin 46 may be provided with a suitable bearing sleeve 47. The pin is provided with a central bore 48 with which communicates a radial bore 49 leading to the bearing surface and communicating with a circumferential groove 45' in the bearing surface. Bore 48 is in communication with a passage 50 formed in arm 28 which is supplied with lubricant under pressure from the bearing of pin 26 in the wall 21, the arm 28 being rigidly connected to the pin 26.

Link 41 is also provided with a somewhat elongated recess 51. The walls of this recess constitute semi-cylindrical portions 52 and 53 connected by flat portions 54 and 55. Journaled within the recess 51 is a pin 56 which is rigidly connected to the arm 30. The outer diameter of pin 56 is substantially equal to the diameter of the semi-cylindrical walls 52 and 53, and equal to the distance between the flat portions 54 and 55.

Extending longitudinally of the link from either side of the recess 51 are cylindrical bores 57 and 58 within which are reciprocably mounted piston-like members 59 and 60, the outer surfaces of the heads of which are formed as parts of a cylinder having the same diameter as the walls 52 and 53. Mounted within the pistons 59 and 60 are cup members 61 and 62 which have close fit within the respective pistons. Springs 63 and 64 are disposed within the cylinders and cups and tend to force them apart, thereby forcing the cylindrical surfaces on the heads of the pistons against the pin 56.

Link 40' is provided with a longitudinal bore 65, closed at one end by means of a plug 66, which bore is placed in communication by means of a bore 67 with the bearing groove 45'. Transverse bores 68 and 69 connect bore 65 with the recesses 57 and 58, respectively, adjacent to the ends of these recesses remote from the bearing recess 51. The bores 68 and 69 are so located with respect to the length of the skirts on the pistons 59 and 60 that the ends of these bores are just covered by the skirts when the pistons are in the position shown in Fig. 5, that is, with the pin 56 in a centered intermediate position within the elongated recess 51. The cups 61 and 62 are each provided with a plurality of openings 70 and 71, respectively, located so as to be just uncovered by the skirts of the pistons when the latter are in the position shown in Fig. 5. The fit of the pistons 59 and 60 in the bores 57 and 58, respectively, is such that a restricted flow of oil may take place therebetween to the elongated recess 51.

The operation of the above described device is as follows:

During operation of the motor, lubricant is supplied under pressure by any suitable means to the bearing of the pin 26 in the wall 21. From this bearing the lubricant flows through a bore formed in the pin 26 to the pasage 50 in the arm 28, thence through the bores 48 and 49 in the pin 46 to the bearing between the pin and the link 40', thus lubricating this bearing. Oil under pressure flows from bore 49 through the bearing groove 45' and the bores 67, 65, 68, and 69 to the bores 57 and 58. Although in the positions shown in Fig. 5, the ends of the bores 68 and 69 are covered by the skirts of the pistons 59 and 60, nevertheless a certain amount of lubricant is forced past the ends of the skirts and through the openings 70 and 71 into the spaces enclosed by the cup 61 and piston 59 and the cup 62 and piston 60, where it is trapped.

In the event a shock, resulting for instance from an explosion in one of the cylinders, is transmitted to the mechanism including the arms 28 and 30 and the link 40', this shock is absorbed by the dash-pot arrangement provided by the pistons and cups.

Assume that this shock acts to move the pin 56 relative to the link 40' in a direction to the right, as viewed in Fig. 5. In order for such movement to take place, the piston 60 must be moved to the right, thus reducing the volume of the space enclosed by the piston and the cup 62. Inasmuch as this space is filled with non-compressible liquid, its volume may be reduced only by the expulsion of some of the liquid. The liquid may be expelled through the openings 71 in the cup, and may pass between the right hand end portion of the skirt of the piston and the wall of bore 58 to the bore 69. This restricted flow provides resistance to movement of the piston to the right, but initial movement is not too greatly resisted owing to the fact that the oil has to travel through the clearance space around the piston only a short distance before reaching bore 69, and while oil in this bore is under the pressure of the lubricating system of the engine, the pressure generated in the trapped oil by the shock being absorbed is many times that in bore 69, so that back flow into this bore occurs very readily. Hence, the piston 60 may initially yield fairly readily but with substantial resistance under the force of a shock to absorb it. As soon as the piston 60 is moved to the right, the end of its skirt starts to close the ports 71, thus reducing the rate of flow of liquid through these ports and hence increasing the resistance to further displacement of the cylinder, the total resistance being further increased by the increasing length of clearance space between the end of the piston skirt and bore 69 which must be traversed by the oil. Before the end of the skirt can strike the end of bore 58, the ports 71 have been completely closed. Thereafter, further movement of the piston to the right is possible only by flow of trapped oil serially through the clearance space between the cup and the piston and between the piston and its bore. This is sufficient to completely absorb the shock and arrest the movement of the piston.

At the same time the spring 63 causes the piston 59 to move to the right, thus uncovering the end of bore 68 and permitting unrestricted flow of fluid into the recess 57, whereby the space enclosed within piston and cup is maintained completely filled with liquid. When the effect of the shock has passed, the spring 64, which was compressed by the displacement of the piston 60 to the right, tends to move the piston and hence the pin 56 back to the position illustrated in Fig. 5. During this movement the piston 59 is moved to the left. The spring 63, having expanded upon the previous movement to the right of the piston 59, offers but a small resistance to the return of the piston. The liquid expelled from the space within the piston 59 and cup 61, during such return motion of the piston, may pass without restriction into the bore 68, inasmuch as the end of this bore has been uncovered by the previous movement to the right of the piston. As soon as the piston has moved back to its normal position, the end of bore 68 is covered and further expulsion of liquid may take place only by flow between the piston and the wall of the bore 57. Also, in this position, the forces exerted by the springs 63 and 64 are equal and tend to retain the pin 56 in its intermediate position until the next shock occurs. Should this shock act in a direction tending to move the pin 56 to the left relative to the link 40′, the operation of the device will be the same as that described, except that the shock will be cushioned by the piston 59 located on the left side of the pin 56, as viewed in Fig. 5.

In the embodiment illustrated in Fig. 6, the gears 23, 24, and 27 of the previous embodiments are replaced by a linkage mechanism. Rigidly secured to the crankshaft 10 is an arm 75 which is pivotally connected by means of a pin 76 to a link 77. The other end of link 77 is pivotally connected by means of a pin 78 to an arm 79 fixed to a shaft 80 rotatably mounted in a wall or diaphragm 81 of the crankcase. The effective length of arms 75 and 79 are the same. A crank arm 82 is rigidly secured to shaft 80 and is pivotally connected by means of a pin 83 to an arm 84 forming part of or integral with a spool 85 which is rotatably mounted on the crank pin 86 and which carries the connecting rod bearings 87 on which the connecting rods 88 are pivotally mounted. The effective length of crank 82 is the same as the throw of the crankshaft.

Upon rotation of the crankshaft 10 the cranks 75 and 79 are caused to rotate in the same direction and at the same speed, thus remaining always parallel to each other. Likewise, the crank 82 is always parallel to the web 89 of the crankshaft and consequently the spool 85 moves parallel to itself.

In the modification shown in Fig. 7 the crank 75 and link 77 are replaced by an eccentric 95 mounted on the crankshaft 10 and cooperating with an eccentric strap 96 which is pivotally connected by means of the pin 78 to the arm 79. Arm 79 carries the crank 82, which is pivotally connected with the arm 84 in the same manner as described in connection with Fig. 6.

The operation of this modification is the same as that shown in Fig. 5. The length of crank 79 is equal to the eccentricity of the eccentric 95 and consequently rotation of the crankshaft 10 and the eccentric causes the crank 79 to turn in the same direction and at the same speed as the crankshaft. Thus the spool 85 is caused to move in a circular path and parallel to itself. In Fig. 7 the parts are shown in solid lines in one position and in dotted lines in a position corresponding to a crank rotation of 45° and it will be noted that the spool 55 is parallel to itself in the two positions.

From the foregoing description it will be evident that the invention may be embodied in various different forms all of which provide certain features in common which are of material practical advantage. In each instance the motion transmitting mechanism for causing the connecting rod spool to move parallel to itself consists of a single train of force transmitting parts which is of simple and compact construction and which is strong and rugged in nature. As will be observed particularly from Fig. 4, the nature of the mechanism is such that it is very readily applicable to multibank engines, and is applicable to either single or multi-bank engines without necessitating material increase in crankshaft length between adjacent main bearings, which is of course of substantial importance in maintaining rigidity of crankshaft construction. The motion transmitting connection between crankshaft and the connecting rod spool is furthermore not subject to undue stresses imposed on it by unequal expansion between different parts. Finally, the construction provides for simple and compact means whereby the motion transmitting mechanism may be relieved of high shock loads imposed by cylinder explosion pressures, which shock loads are frequently of alternating character in engines of the character under consideration and which are detrimental to the quiet operation and long life of mechanism including gears in the line of power transmission.

The invention is not limited to the specific examples of construction shown by way of illustration, which obviously may be varied without departing from the principles of the invention, and it is therefore to be considered as embracing all forms of construction falling within the scope of the appended claims.

What is claimed is:

1. In a multicylinder engine, a crankshaft having a crank pin, a spool member mounted on said crank pin, connecting rods for the several cylinders of the engine connected to said spool member, the places of connection between said rods and said spool member being equidistant from the center of the spool member, a rotatable member mounted to rotate about a center offset with respect to the crankshaft axis, motion transmitting mechanism connecting said rotatable member with said crankshaft and arranged to cause said rotatable member to rotate in the same direction as that of the crankshaft, and a motion transmitting connection between said rotatable member and said spool member, said connection connecting with said spool member at a place further from its center than the places of connection of said rods thereto.

2. In a multicylinder engine, a crankshaft having a crank pin, a spool member rotatably mounted on said crank pin, connecting rods for the several cylinders of the engine connected to said spool member, a rotatably mounted member, motion transmitting mechanism connecting said rotatably mounted member and said crankshaft for causing said rotatably mounted member to rotate in the same direction as that of the crankshaft and at crankshaft speed, said rotatably mounted member being connected to said spool member, the place of connection between said members being located at a distance from the center of rotation of said rotatably mounted member equal to the throw of said crank pin.

3. In a multicylinder engine, a crankshaft having a crank pin, a spool member rotatably mounted on said crank pin having a radially extending arm and a circularly arranged series of connecting rod bearings, a stationary member, a gear rotatably carried by said stationary member, a gear on said crankshaft, said gears having the same pitch circle diameter, an idler gear connecting the two aforesaid gears, and an arm rotatable with the first mentioned gear pivotally attached to the arm on said spool member.

4. In a multicylinder engine, a crankshaft having a crank pin, a gear on said shaft, a spool member rotatably mounted on said crank pin, said spool member having a series of connecting rod bearings and a portion extending radially beyond said connecting rod bearings, a stationary member, an idler gear carried by said stationary member and meshing with the gear on the crankshaft, a second gear carried by said stationary member and meshing with said idler gear, said second gear having the same pitch circle diameter as that of the crankshaft gear, an arm fixed to rotate with said second gear, said arm being pivotally connected to the arm on said spool member and the distance between said pivotal connection and the axis of rotation of said second gear being equal to the throw of said crank pin.

5. In a multicylinder engine having a plurality of banks of cylinders, a crankshaft having at least two crank pins, a stationary part located between the planes of rotation of said crank pins, a gear on the crankshaft between said crank pins, an idler gear carried by said stationary part and meshing with the crankshaft gear, and a motion transmitting member rotatably carried by said stationary member, said motion transmitting member including a gear meshing with said idler gear and a plurality of arms fixed to rotate with the gear, there being at least one arm on each side of said stationary part, a spool member mounted on each of said crank pins, each of said spool members having connected thereto the connecting rods for its respective bank of cylinders, and pivotal connections between said arms and said spool members.

6. In a multicylinder engine having at least two banks of cylinders, a crankshaft having angularly displaced crank pins, one for each of said banks of cylinders, a stationary support member situated between said banks of cylinders, a gear mounted on said crankshaft between said crank pins, an idler gear carried by said diaphragm member and meshing with the crankshaft gear, motion transmitting mechanism including a rotatably mounted member extending through said support member, a gear fixed to said rotatable member and meshing with said idler gear and an arm on each side of said support member fixed to rotate with said rotatable member, a spool member rotatably mounted on each of said crank pins, each of said spool members being adapted to have attached thereto the connecting rods for the cylinders of its respective bank and having a radially extending arm, and pivotal connections between the arms on said spool members and the arms on said motion transmitting member, the last mentioned arms extending in angularly displaced directions from the center of rotation of said motion transmitting member.

7. In a multicylinder engine, a crankshaft having a crank pin, a spool member rotatably mounted on said crank pin and provided with a plurality of connecting rod bearings, a member rotatably mounted parallel to said crankshaft, a crank arm carried by said crankshaft, a crank arm carried by said rotatable member, said crank arms being the same length, a link connecting said crank arms, and an arm fixed to said rotatable member and pivotally connected to said spool members, the length of said arm being equal to the throw of said crank pin.

8. In a multicylinder engine, a crankshaft having a crank pin, a spool member rotatably mounted on said crank pin and provided with a plurality of connecting rod bearings, a member rotatably mounted parallel to said crankshaft, an eccentric carried by said crankshaft, a crank arm carried by said rotatable member, an eccentric strap engaging said eccentric and pivotally connected to said crank arm, the length of said crank arm being equal to the eccentricity of said eccentric, and an arm fixed to said rotatable member and pivotally connected to said spool member, the length of said arm being equal to the throw of said crank pin.

9. In a multicylinder engine having a bank of cylinders, a crankshaft having a crank pin, a spool rotatably mounted on said crank pin, connecting rods for the several cylinders of said bank connected to said spool member, a rotatably mounted member, motion transmitting mechanism connecting said member and said crankshaft for causing said member to rotate in the same direction and at the same speed as the crankshaft, and a link pivotally connected to said member and to said spool, the place of connection between said link and said member being located at a distance from the center of rotation of said member equal to the throw of said crank pin.

10. In a multicylinder engine, a crankshaft having a crank pin, a spool rotatably mounted on said pin having a radially extending arm and a series of circularly arranged connecting rod bearings, a stationary member, a gear rotatably carried by said stationary member, a gear on said crankshaft, said gears having the same pitch circle diameter, an idler gear connecting the aforesaid gears, an arm rotatable with the first mentioned gear, and a link pivotally connected to the last mentioned arm and the arm on said spool.

11. In a multicylinder engine having a bank of cylinders, a crankshaft, a spool member rotatably mounted on said crankshaft, connecting rods for the several cylinders of said bank connected to said spool member, and motion transmitting mechanism including a driving connection between the crankshaft and the spool member for causing said spool member to move parallel to itself with the crankshaft upon rotation of the crankshaft, said motion transmitting mechanism including fluid cushioning means for absorbing shock.

12. In a multicylinder engine having a bank of cylinders, a crankshaft having a crank pin, a spool rotatably mounted on said crank pin, connecting rods for the several cylinders of said bank connected to said spool member, a rotatably mounted member, motion transmitting mechanism connecting said member and said crankshaft for causing said member to rotate in the same direction and at the same speed as the crankshaft and a link including means for absorbing shock pivotally connected to said member and to said spool, the place of connection between said link and said member being located at a distance from the center of rotation of said member equal to the throw of said crank pin.

13. In a multicylinder engine having a bank of cylinders, a crankshaft having a crank pin, a spool rotatably mounted on said crank pin, connecting rods for the several cylinders of said bank connected to said spool member, a rotatably mounted member, motion transmitting mechanism connecting said member and said crankshaft for causing said member to rotate in the same direction and at the same speed as the crankshaft, a link formed with spaced parallel bearings, a pin connected to said member journaled in one of said bearings and a pin connected to said spool journaled in the other of said bearings, one of said bearings being elongated in the longitudinal direction of the link whereby longitudinal displacement of the pin within the bearing may take place, and means for yieldingly resisting said displacement, the distance between the center of the pin on said member and the center of rotation of said member being equal to the throw of said crank pin.

14. In a multicylinder engine having a bank of cylinders, a crankshaft having a crank pin, a spool rotatably mounted on said crank pin, connecting rods for the several cylinders of said bank connected to said spool member, a rotatably mounted member, motion transmitting mechanism connecting said member and said crankshaft for causing said member to rotate in the same direction and at the same speed as the crankshaft, a link formed with spaced parallel bearings, a pin connected to said member journaled in one of said bearings and a pin connected to said spool journaled in the other of said bearings, one of said bearings being elongated in the longitudinal direction of the link whereby longitudinal displacement of the pin within the bearing may take place, reciprocable members mounted for movement longitudinally of said link and bearing against opposite sides of the pin in said elongated bearing, and liquid cushioning means for yieldingly resisting displacement of said reciprocable members by the pin in said elongated bearing, the distance between the center of the pin connecting said link with said rotatably mounted member and the center of rotation of said member being equal to the throw of said crank pin.

15. In a motion transmitting mechanism, a link formed with a bearing adapted to have a pin journaled therein, said bearing being elongated in the longitudinal direction of said link whereby displacement of the pin within the bearing may take place, and means within said link and bearing against opposite sides of said pin for yieldingly resisting displacement of said pin in said recess.

16. In a motion transmitting mechanism, a link formed with spaced bearings adapted to have pins journaled therein, one of said bearings being elongated in the longitudinal direction of said link whereby displacement of the pin within the bearing may take place, said link being formed with longitudinal bores extending from either side of said elongated recess, members reciprocable within said bores and bearing against the pin in said elongated recess, said link being formed with a passageway leading from the other bearing to each of said bores for conducting liquid to said bores, and means for restricting expulsion of liquid from said bores under the action of said members to thereby yieldingly restrain displacement of the pin in said elongated bearing.

17. In a motion transmitting mechanism, a link formed with spaced bearings adapted to have pins journaled therein, one of said bearings being elongated in the longitudinal direction of said link whereby displacement of the pin within the bearing may take place, said link being formed with longitudinal bores extending from either side of said elongated bearing, hollow members reciprocable within said bores and bearing against the pin in said elongated bearing and cup-like members seating against the closed ends of said bores and extending within said hollow members, said cup-like members being formed with ports adjacent to the ends of said hollow members, said link being formed with a passageway leading from the other bearing to each of said bores for conducting liquid to said bores, said hollow members cooperating with said ports to restrict expulsion of liquid therethrough under the action of said hollow members to thereby yieldingly restrain displacement of the pin in said elongated bearing.

18. In a motion transmitting mechanism, a link formed with spaced bearings adapted to have pins journaled therein, one of said bearings being elongated in the longitudinal direction of said link whereby displacement of the pin within the bearing may take place, said link being formed with longitudinal bores extending from either side of said elongated bearing, hollow members reciprocable within said bores and bearing against the pin in said elongated bearing, cup-like members seating against the closed ends of said bores and extending within said hollow members, said cup-like members being formed with ports adjacent to the ends of said hollow members, said link being formed with a passageway leading from the other bearing to each of said bores for conducting liquid to said bores, said hollow members cooperating with said ports to restrict expulsion of liquid therethrough under the action of said hollow members to thereby yieldingly restrain displacement of the pin in said elongated bearing recess and resilient means acting against said hollow members and tending to maintain the pin in an intermediate centered position within said elongated bearing.

19. In a multicylinder engine, a crankshaft having a crank pin, a spool member rotatably mounted on said crank pin and having a plurality of connecting rod bearings, motion transmitting mechanism for causing said spool member to rotate parallel to itself in the orbit of the crank pin, said mechanism including a rotatably mounted member driven from the crankshaft at crankshaft speed, and a yieldable link connection between said spool member and said rotatable member.

20. In a multicylinder engine, a crankshaft having a crank pin, a spool member rotatably mounted on said crank pin and having a plurality of connecting rod bearings, motion transmitting mechanism causing said spool member to move parallel to itself in the orbit of the crank pin, said mechanism comprising parts providing a driving connection between the crankshaft and said spool member, certain of said parts being yieldably connected, and liquid cushioning means for resisting displacement of the yieldably connected parts with respect to each other.

21. In a multicylinder engine, a crankshaft having a crank pin, a spool member rotatably mounted on said crank pin and having a plurality of connecting rod bearings, motion transmitting mechanism causing said spool member to move parallel to itself in the orbit of the crank pin, said mechanism comprising parts providing a driving connection between the crankshaft and said spool member, certain of said parts being yieldably connected, and liquid cushioning means utilizing oil from the lubrication system of the engine as the cushioning medium for resisting displacement with respect to each other of the yieldably connected parts.

CHARLES LANIER LAWRANCE.